US007392102B2

(12) United States Patent
Sullivan et al.

(10) Patent No.: US 7,392,102 B2
(45) Date of Patent: *Jun. 24, 2008

(54) METHOD OF SYNCHRONIZING THE PLAYBACK OF A DIGITAL AUDIO BROADCAST USING AN AUDIO WAVEFORM SAMPLE

(75) Inventors: Gary E. Sullivan, Trabuco Canyon, CA (US); Dusty D. Rector, Southlake, TX (US)

(73) Assignee: Gateway Inc., Irvine, CA (US)

( * ) Notice: Subject to any disclaimer, the term of this patent is extended or adjusted under 35 U.S.C. 154(b) by 1424 days.

This patent is subject to a terminal disclaimer.

(21) Appl. No.: 10/128,395

(22) Filed: Apr. 23, 2002

(65) Prior Publication Data

US 2003/0198255 A1 Oct. 23, 2003

(51) Int. Cl.
G06F 17/00 (2006.01)
H04J 3/06 (2006.01)
(52) U.S. Cl. .......................... 700/94; 370/503
(58) Field of Classification Search .................. 700/94; 381/10, 80; 370/503
See application file for complete search history.

(56) References Cited

U.S. PATENT DOCUMENTS

| 3,798,650 | A | 3/1974 | McComas et al. |
| 4,005,266 | A | 1/1977 | Lehr et al. |
| 4,234,958 | A | 11/1980 | Pipes et al. |
| 4,543,657 | A | 9/1985 | Wilkinson |
| 4,843,617 | A | 6/1989 | Marshall et al. |
| 5,146,585 | A | 9/1992 | Smith, III |
| 5,388,102 | A | 2/1995 | Griffith et al. |
| 5,402,450 | A | 3/1995 | Lennen |
| 5,416,808 | A | 5/1995 | Witsaman et al. |
| 5,469,467 | A | 11/1995 | Vella-Colerio |
| 5,530,704 | A | 6/1996 | Gibbons et al. |
| 5,619,582 | A * | 4/1997 | Oltman et al. ................. 381/82 |
| 5,734,985 | A | 3/1998 | Ito et al. |
| 6,175,604 | B1 | 1/2001 | Noro et al. |
| 6,243,372 | B1 | 6/2001 | Petch |
| 6,466,832 | B1 * | 10/2002 | Zuqert et al. ................... 700/94 |
| 6,611,537 | B1 * | 8/2003 | Edens et al. ................. 370/503 |
| 6,671,494 | B1 * | 12/2003 | James ........................ 455/66.1 |
| 7,030,930 | B2 * | 4/2006 | Kovacevic .................. 348/515 |
| 7,209,795 | B2 * | 4/2007 | Sullivan et al. ............... 700/94 |
| 2001/0008535 | A1 * | 7/2001 | Lanigan ...................... 370/487 |
| 2004/0148159 | A1 * | 7/2004 | Crockett et al. ............. 704/211 |
| 2006/0002681 | A1 * | 1/2006 | Spilo et al. .................... 386/46 |

* cited by examiner

Primary Examiner—Sinh Tran
Assistant Examiner—Daniel R Sellers
(74) Attorney, Agent, or Firm—Jeffrey A. Proehl; Woods Fuller Shultz & Smith

(57) ABSTRACT

A method is provided for synchronizing the playback of a digital audio broadcast on a plurality of network output devices by inserting an audio waveform sample in an audio stream of the digital audio broadcast. The method includes the steps of outputting a first unique signal as part of an audio signal which has unique identifying characteristics and is regularly occurring, outputting a second unique signal so that the time between the first and second unique signals must be significantly greater than the latency between sending and receiving devices, and coordinating play of audio by an audio waveform sample assuring the simultaneous output of the audio signal from multiple devices. An algorithm in hardware, software, or a combination of the two identifies the audio waveform sample in the audio stream. The digital audio broadcast from multiple receivers does not present to a listener any audible delay or echo effect.

32 Claims, 9 Drawing Sheets

AUDIO SAMPLE
TRANSMITTED BY PCA

AUDIO SAMPLE
RETURNED TO PCA FROM PC$_N$

LATENCY

AUDIO SAMPLE
ACTED UPON BY PC$_N$

TIME DRIFT

US 7,392,102 B2

METHOD OF SYNCHRONIZING THE PLAYBACK OF A DIGITAL AUDIO BROADCAST USING AN AUDIO WAVEFORM SAMPLE

This invention references a patent application entitled "A Method of Synchronizing Clocks the Playback of a Digital Audio Broadcast by Inserting an audio waveform sample", Ser. No. 10/128,119, and a patent application entitled "A Method of Manually Fine-Tuning Audio Synchronization of a Home Network", Ser. No. 10/128,369.

FIELD OF THE INVENTION

This invention generally relates to audio playback for multiple devices, and specifically, to synchronizing the audio playback.

BACKGROUND OF THE INVENTION

In order to achieve a depth and richness of sound, two or more audio devices are used to provide a surround sound effect to the listener. These audio devices may be cabled to a controller device which provides the audio data to them. A bus may be used to supply this data. Alternatively, the different devices may communicate with each other through wireless communication, such as through an RF or infrared port.

In a system in which one computer or device broadcasts a single digital audio stream that is then simultaneously received by more than one receiving device, the different receiving devices will often play their audio slightly out of sync with each other, due to differing latencies in receiving and processing the digital audio stream. This produces an echo or delay effect which causes a listener to receive the same audio at slightly different times from the multiple devices. The listener's enjoyment is thereby impaired.

A method and apparatus for synchronizing the playback of audio from several devices is needed.

SUMMARY OF THE INVENTION

The present invention provides a method and apparatus for synchronizing the playback of the audio from several audio receivers by using an audio waveform sample so that there is no audible delay or echo effect between them when listened to simultaneously.

In a first aspect of the present invention, a method of synchronizing the playback of a digital audio broadcast on a plurality of network output devices inserts an audio waveform sample in an audio stream of the digital audio broadcast. The method includes the steps of outputting first and second unique signals as part of an audio signal which has unique identifying characteristics and is regularly occurring, so that the time between the first and second unique signals must be significantly greater than a latency between sending and receiving devices (at least two times greater; preferably three, four, or more times greater), outputting an audio waveform sample, outputting an audio stream, and coordinating play of audio by setting the play point of the audio stream according to the audio waveform sample assuring the simultaneous output of the audio signal from multiple devices. The digital audio broadcast from multiple receiving devices does not present to a listener any audible delay or echo effect.

In a second aspect of the present invention, a system for synchronizing audio playback of multiple receiving devices is disclosed which has a transmitting device and two or more receiving devices, wherein the receiving devices are synchronized through at least two of the group consisting of an audio waveform sample, communication latency, and processing latency. The system has a time drift detector, a clock synchronizer, a latency detector, and manual fine tune control. The receiving devices are synchronized through audio waveform samples and the communication latency is shorter than the time interval between consecutive audio waveform samples.

In a third aspect of the invention, a system for synchronizing the audio playback of two or more receiving devices is disclosed which has means for transmitting consecutive unique signals in an audio stream and means for receiving the consecutive unique signals in the audio stream. The time the means for receiving the unique signal takes to act upon the unique signal being determined by a communications latency between the transmitting means and the receiving means and a processing latency determined by internal processing by the receiving means. There is also means for synchronizing clocks located in the receiving means and means for detecting time drift in the receiving means.

It is to be understood that both the forgoing general description and the following detailed description are exemplary and explanatory only and are not restrictive of the invention as claimed. The accompanying drawings, which are incorporated in and constitute a part of the specification, illustrate an embodiment of the invention and together with the general description, serve to explain the principles of the invention.

BRIEF DESCRIPTION OF THE DRAWINGS

The numerous advantages of the present invention may be better understood by those skilled in the art by reference to the accompanying figures in which.

DETAILED DESCRIPTION OF THE INVENTION

Figure 1:
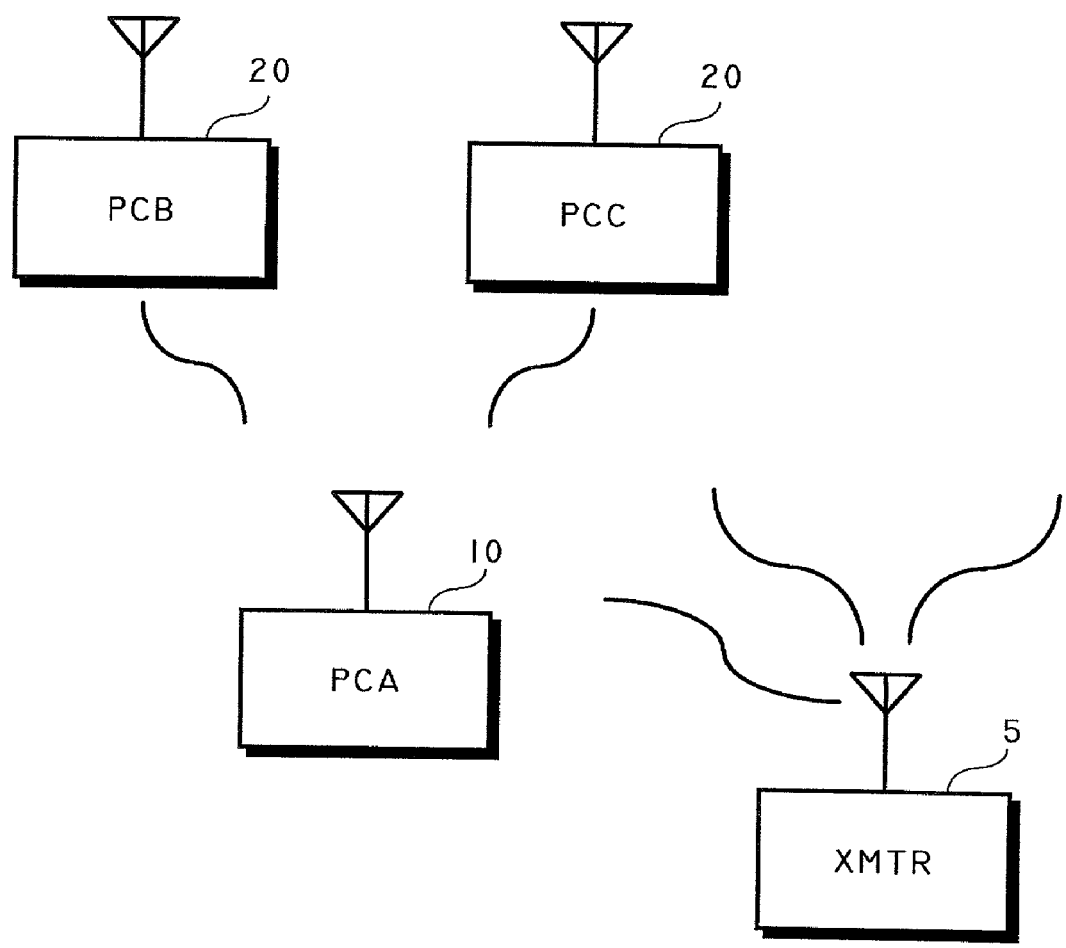
FIG. 1 illustrates a system having a plurality of devices.

Reference will now be made in detail to the presently preferred embodiments of the invention, examples of which are illustrated in the accompanying drawings.

Referring generally now to FIGS. 1 through 10, exemplary embodiments of the present invention are shown. This invention describes a method of enabling simultaneous output of audio signals on multiple output devices by including time output information, pulse output signal information, and a user adjustable control to control the delay of signal between source and output systems. The method may be used to synchronize audio output on network output devices. The method may use a network clock synchronization method to sync the clocks of all the connected devices. In addition to this synchronization, a regularly scheduled audio waveform sample is also broadcast. The audio waveform sample may be used as a triggering metric for audio output according to the attached tag thus assuring the simultaneous output of audio from multiple devices. The audio waveform sample may also be used to determine the time the device takes to process the signal from the buffer to the actualized audio output. This delay is added to the communication delay to better synchronize the audio output between multiple output devices. The effect of the process is that all devices receiving the data are able to output them simultaneously, taking both communication and processing latency into consideration.

The method of synchronizing audio playback may be employed on a set of audio playback devices tuned to a common network digital audio broadcast. All audio playback devices are running synchronized clocks. This method does not require that the transmitting device be in sync with the receivers. It requires that only the receivers stay in sync. The method uses a latency detector, a clock synchronizer, and a time drift detector. A master reference computer or other device first sets its own clock, then sets all clocks on all receiving devices using the latency detector and clock synchronizer. It periodically repeats the process, possibly during silence between audio broadcasts, so that the clocks stay in sync. Each receiver also periodically adjusts for time drift, between clock synchronizations, using its time drift detector.

The present invention provides a method and apparatus for synchronizing the audio playback of several devices by using an audio waveform sample. One device can determine whether a specific section of the digital audio stream is being played either behind or ahead of the same section being played on another device, the reference device. It requires that the reference device transfer to the second device a brief portion of a digital waveform it is playing (a series of digital audio samples), along with the exact time at which this waveform is expected to play. The second device locates the same waveform sample in its stream, and can then use it as a reference to adjust its own playback of the audio stream to be in sync with the reference. The waveform is only a small part of the audio stream—it might be a small set of sequential audio samples, or a set of every nth audio sample, to be determined by empirical test. The transmitting device might or might not be playing audio, and could be remote from the receiving devices. If the transmitting device is local and playing audio, it would participate in the same synchronized audio playback method as described below. This method requires nothing of the audio transmitting device, neither time synchronization, nor modification of the digital audio stream. A single time reference device PCA (one of the receivers) first sets its own clock, then sets the clocks on all the other receiving devices, as described above. PCA also keeps a record of the latency value for each receiver. Each receiver periodically adjusts itself for time drift. PCA determines an arbitrary reference interval/audio delay value (i.e., 2 seconds). PCA must keep its own playback of the audio stream delayed by this value. At exactly each reference interval (i.e., every 2 seconds) in the incoming stream, PCA captures a brief signature digital "waveform" of the audio (a series of audio sample values, enough to identify a unique segment of audio).

All devices may buffer the audio stream. Some amount of buffering of the audio stream is occurring, to allow the receiving devices to search forward and backward in the audio data, and to allow them to delay or shift audio playback. Signal transmission may be in analog or digital format.

The transmitting device might or might not be playing audio and does not have to be in sync with the receivers. If the transmitting device is local and playing audio, it would participate in the same synchronized audio playback method.

FIG. 1 illustrates a system of several devices. Transmitting device PCA sends the audio stream, sync information, and time and other data to receiving devices PCn, such as PCB and PCC. Transmitting device PCA controls audio playback for the system. The audio signal is actually transmitted by audio source 5 to PCA and other devices PCn, such as PCB. The devices may be interconnected by a bus cabling or may communicate with one another through wireless communication such as radio frequency or infrared.

Several discrete sub-processes are used in an embodiment of the present invention. These may include a latency detector, a clock synchronizer, a time drift detector, and manual fine tune control. Each networked device supplies a real-time system clock that can be set, that measures time in increments since some beginning absolute point in time, and that measures time in sufficiently small increments to be used as a synchronization reference for digital audio.

An average latency detector detects the latency between transmitting a signal to a device, and the device receiving the signal. "Symmetrical latency" is assumed between two computers, e.g., if a signal packet is sent from PCA to PCB, and an acknowledgment packet is returned from PCB to PCA, the time from PCA to PCB will be, on average, approximately the same as from PCB to PCA.

All devices may account for latency of their own audio playback subsystem. Playback devices must also account for normal latency in the audio subsystem. There are three different methods for this, each of which would occur after the other processes described herein have been used to synchronize the clocks on all audio playback devices. First, shifting the playback by a predetermined value, such value determined through empirical testing of the actual playback device. Second, shifting the playback by a predetermined value, such value determined at run time, by the customer, using the manual audio synchronization fine-tune control, to determine the actual latency of the device's internal audio subsystem. Third, fine-tuning the clock synchronization at run time, by the customer, using the manual audio synchronization fine-tune control.

In an embodiment of the method, several steps are used to determine the latency. First, a variable "latency" is set to 0. Second, PCA fetches its current time and records from "Start Time". Third, PCA sends a signal packet to PCB. Fourth, PCB receives the message and immediately sends an acknowledgment to PCA. Fifth, upon receiving the acknowledgment from PCB, PCA again fetches its local time and records one-half of the difference between Start Time and the current time. Sixth, PCA averages this new latency value with all previous latency values and records it as "latency". After n repeated cycles, it discards any "outliers", values that are not close to the current average. The second through sixth steps are repeated as many times as necessary to get an accurate time reference.

Figure 2:
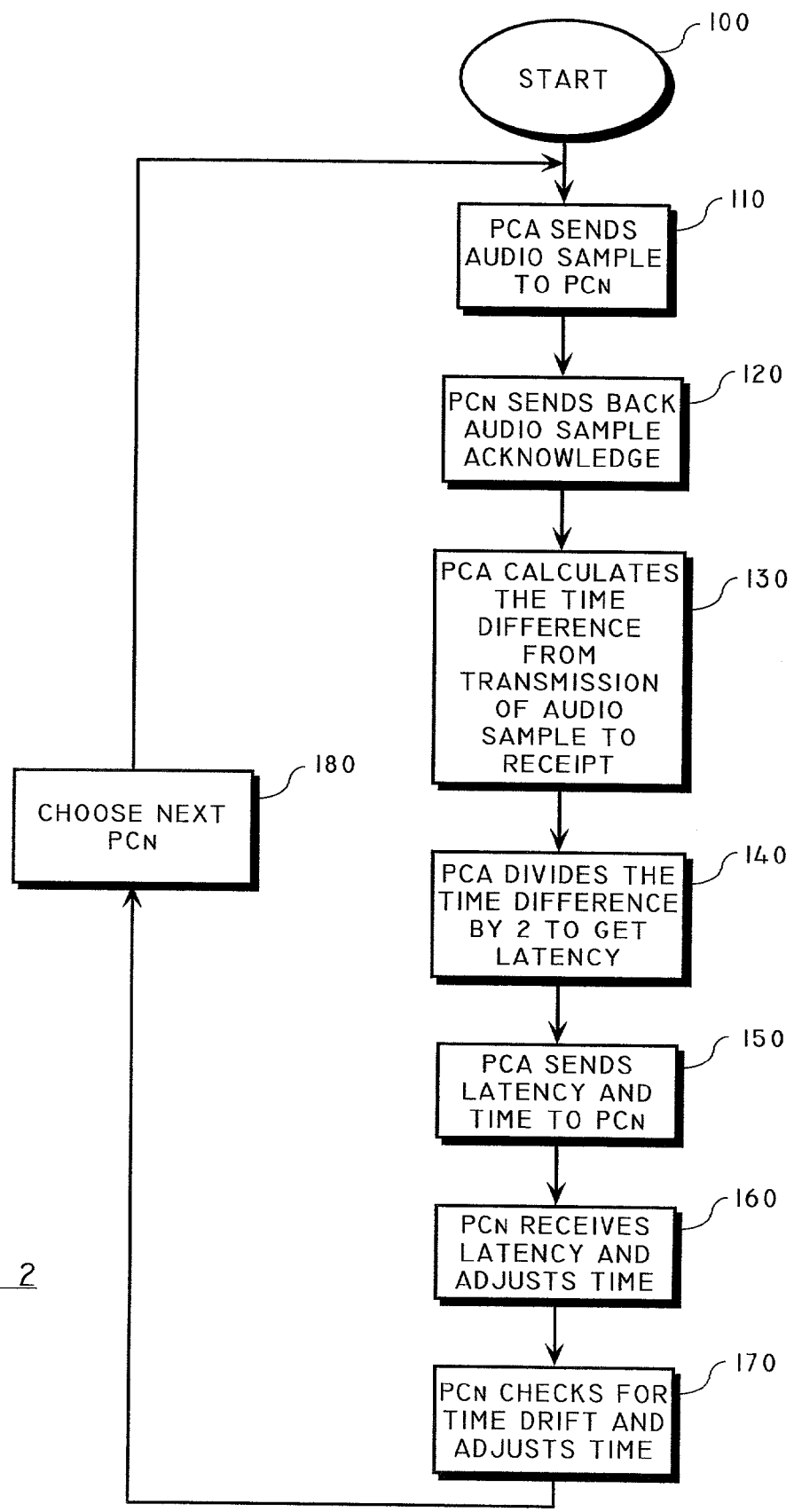
FIG. 2 illustrates a flow chart for setting the time in a receiver device.

FIG. 2 illustrates a flow chart of the steps. At the start, step 100, the latency value is set to zero. The controlling device, PCA, sends the audio waveform sample to receiving device PCn, step 110. PCn sends back the audio waveform sample to PCA, step 120. PCA calculates the time difference from the transmission of the audio waveform sample to its receipt back from the receiving device PCn, step 130. PCA divides the time difference by two to derive the latency, step 140. PCA sends the latency and time to PCn, step 150. PCn receives the latency and adjusts the time, step 160. PCn checks for time drift and adjusts its time, step 170. The next receiving device, PCn, is sent data, step 180.

Figure 4:
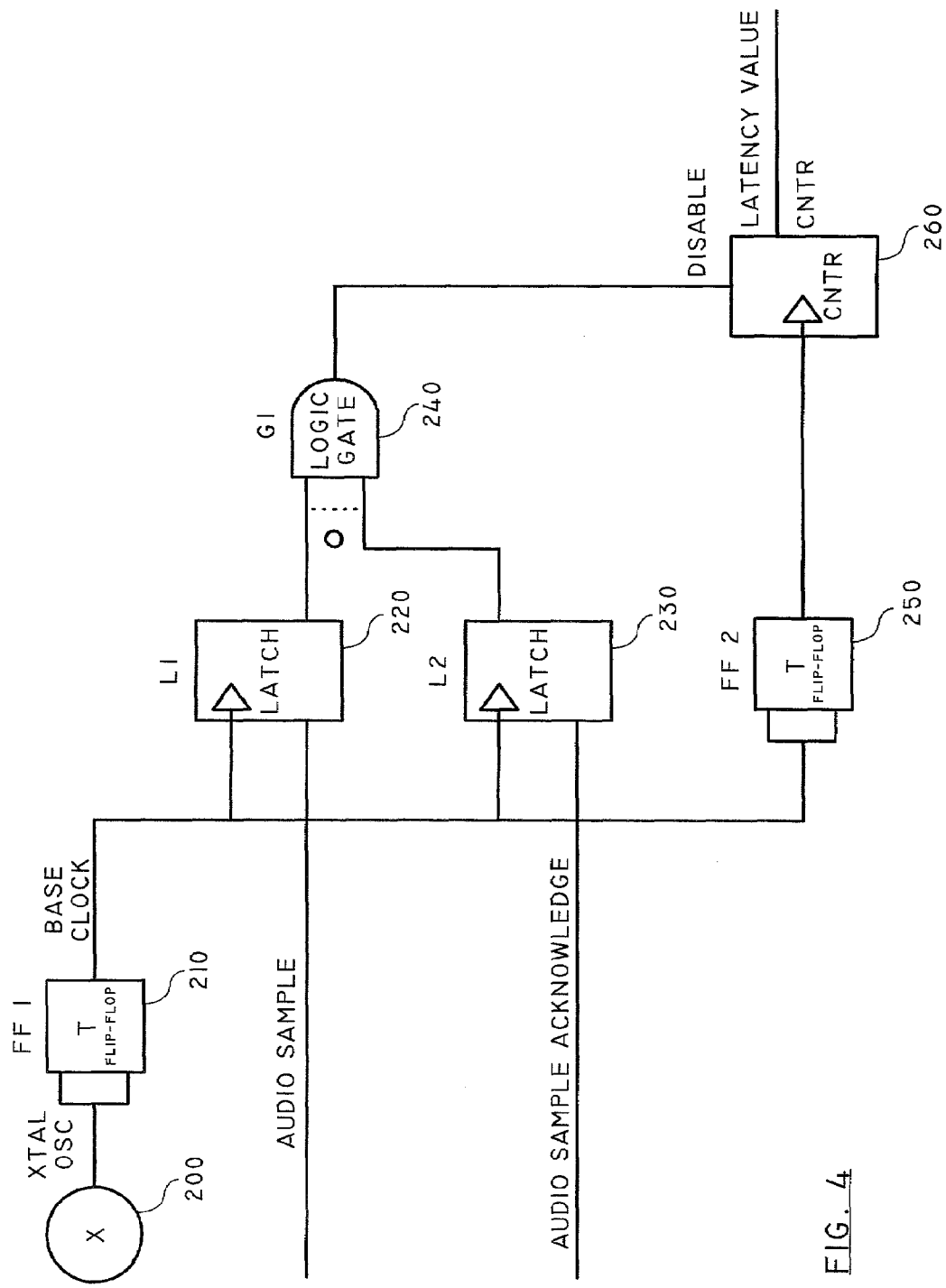
FIG. 4 illustrates an exemplary circuit for deriving the latency value from the audio waveform sample.

FIG. 4 illustrates an example of a hardware implementation to derive a latency value on the assumption of symmetrical latency. An oscillator 200, e.g., a crystal oscillator, is biased to provide a high frequency regular pulsing signal. This is input to a T flip-flop 210 which generates a regular, well squared base clock. The base clock drives the timing of the entire device, including latches 220 and 230 and T flip-flop 250. Latch 220 stores the audio waveform sample or a signal representing when it is active. Transmission of the audio waveform sample may cause the generation of a counterpart digital pulse to be input to the circuit of FIG. 4 as representing the audio waveform sample. Likewise, PCA's receipt of the audio waveform sample from PCn may cause the generation of a counterpart digital pulse to be input to the circuit of FIG. 4. These digital pulses may be generated by pulse width adjustable monostable multivibrators or other means. Latch 230 stores the audio waveform sample returned from receiving device PCn. Logic 240 allows the counter 260 to count from the time the audio waveform sample is sent until the audio waveform sample is returned to PCA from PCn. All the time the T flip-flop is providing a clock signal equal to one-half the clock rate of the base clock, effectively performing a divide-by-two operation to derive the latency value.

If the assumption of symmetrical latency (above) is not true, and if the asymmetry between latency values due to differing performance characteristics between two types of computers can be quantified, this value might be either more or less than one-half.

In the case of asymmetrical latency, various techniques may be employed to determine the latency time between the transmitting device and the receiving device.

Figure 5:
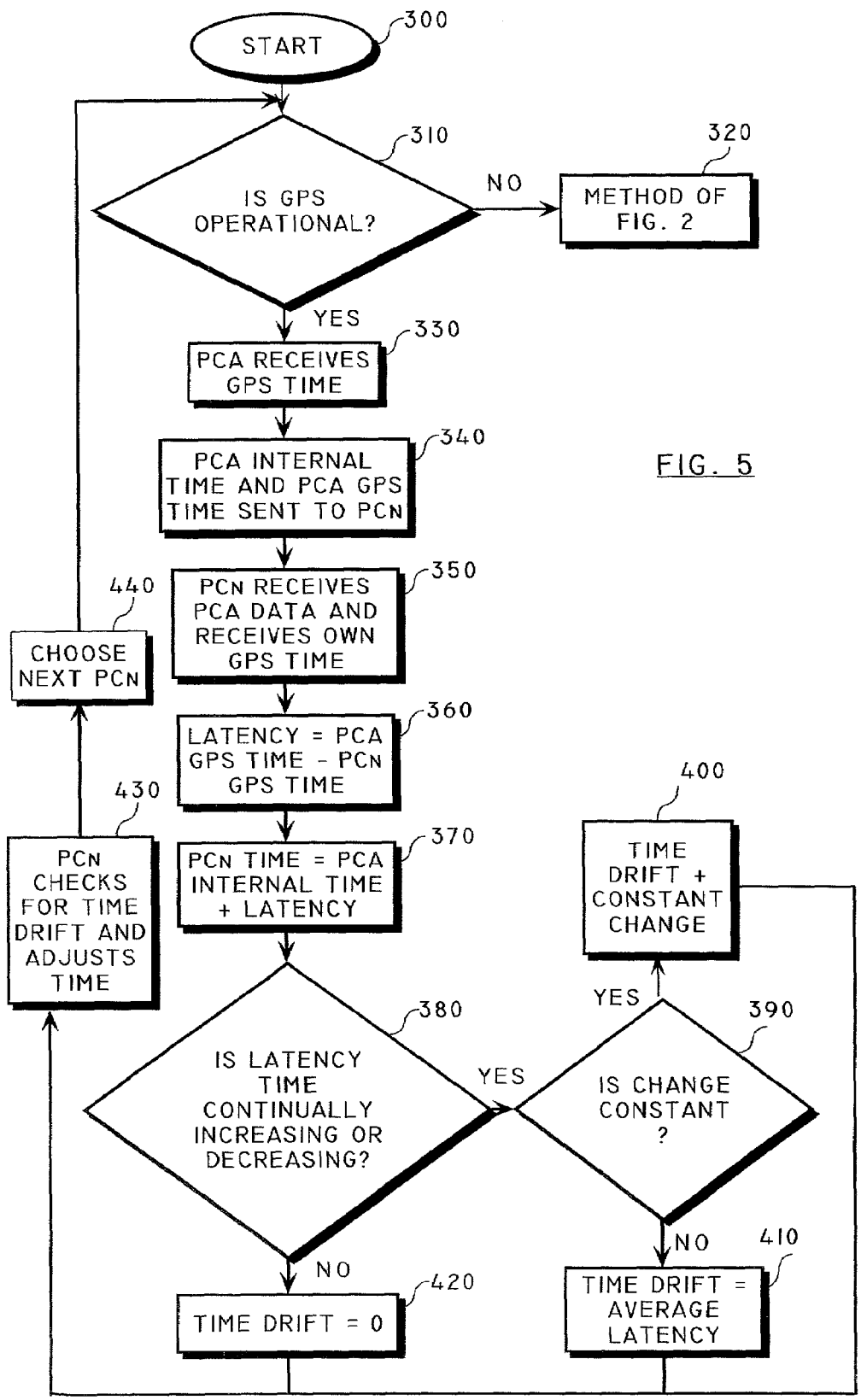
FIG. 5 illustrates an embodiment which uses GPS as the primary system for timing the audio.

In one embodiment, as shown in FIG. 5, the audio waveform sample transmitting device and receiving devices have global positioning system (GPS) receivers which allow time management at the microsecond level. The audio waveform sample transmitting device initializes, step 300, and determines if the GPS time is accessible, step 310. If the GPS time is not accessible, the method of FIG. 2 is used. Otherwise, PCA receives the GPS time, step 330. PCA sends its internal time and GPS time to PCn, step 340. PCn receives this data and accesses its own GPS time, step 350. The latency for PCn is determined by subtracting the GPS time of PCA from the GPS time of PCn, step 360. The PCn time is determined by adding the latency to PCA time, step 370. PCn determines whether the latency is continually increasing or decreasing, step 380. This is done by storing successive samples of latency in chronological order and comparing the different values for trends in magnitude over time. Look up tables may be used for this process. If the change is continually increasing or decreasing, a determination is made as to whether the change is constant, step 390. If it is constant, the time drift is set to the constant change over sample time, step 400. Otherwise, the time drift is set to the average latency, step 410. If the latency time is not continually increasing or decreasing, the time drift is set to zero, step 420. PCn adjusts its time according to the time drift, step 430. The next PCn is selected to receive data, step 440.

A clock synchronizer is a process that one networked computer may use to synchronize another networked computer's clock to its own. By extension, it can then synchronize all of the clocks on n computers by connecting to other computers and repeating the process.

Figure 6:
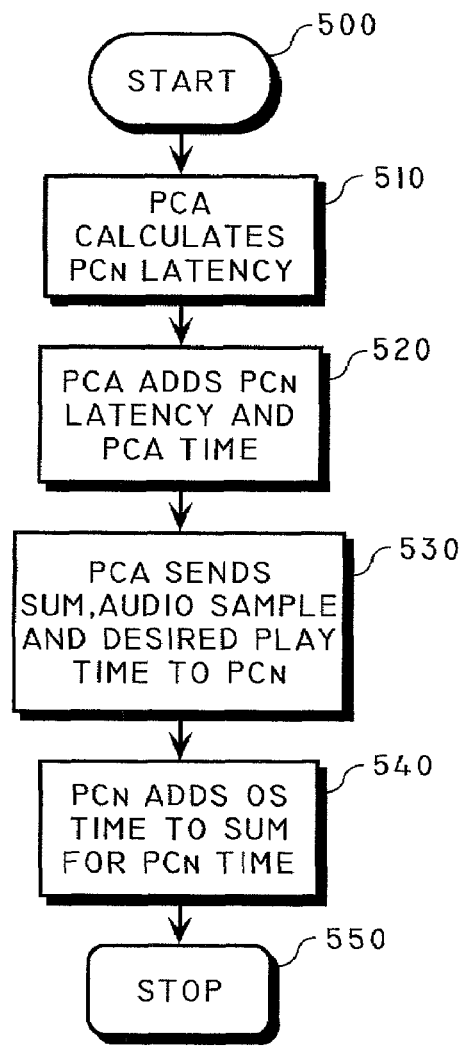
FIG. 6 illustrates a transmitting device's method for calculating PCA and latency time.

In an exemplary embodiment, as shown in FIG. 6, the method includes the following steps. First, the clock synchronizer utilizes the latency detector (above) to determine the average amount of time it takes for a signal to travel from the reference computer or device (PCA) to another device (PCB). Second, PCA fetches its own time, adds the latency value to it and sends it to PCB. Third, PCB takes this time value and adds a known value representing the time it takes for the operating system (OS) to respond to a "time set" command, and sets its own time accordingly.

Figure 7:
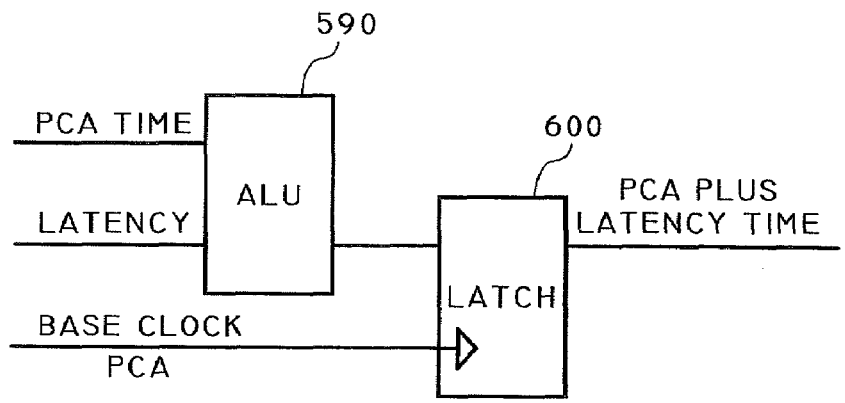
FIG. 7 illustrates an exemplary circuit for deriving a receiving device's time.
Figure 9:
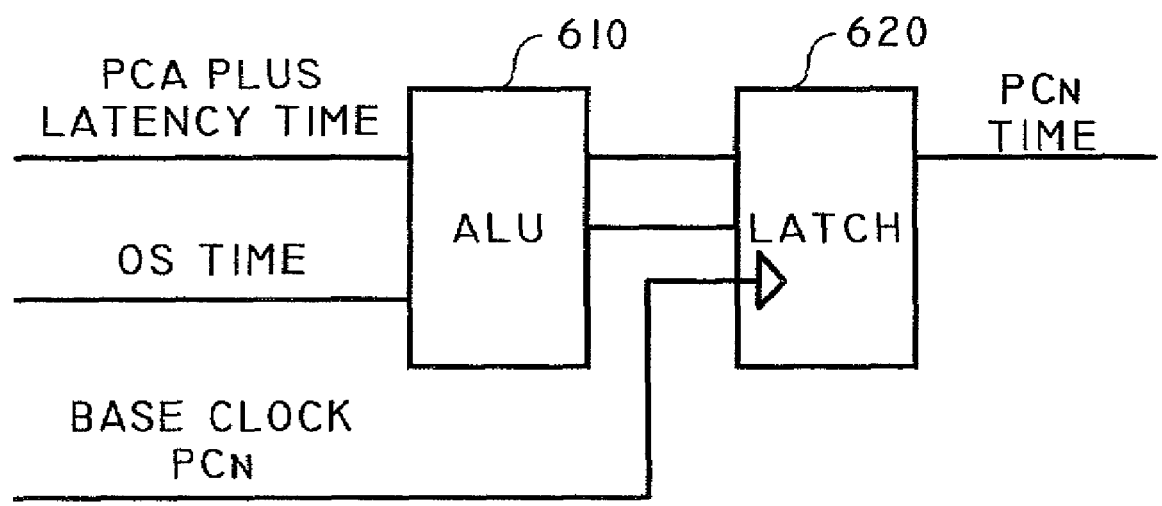
FIG. 9 illustrates a receiving device's method for calculating PCn time.

An exemplary hardware implementation of the circuitry is shown in FIGS. 7 and 9. FIG. 7 refers to circuitry on PCA; FIG. 9 refers to circuitry on PCn. The circuitry of FIGS. 7 and 9 may be combined on either PCA or PCn. ALU 590 adds the latency to PCA time to derive the time to be sent to PCn. The base clock which serves for internal timing of PCA clocks latch 600. This latch stores the PCA with added latency time. FIG. 9 shows a like circuit on receiving device PCn. The ALU 610 causes the addition to or subtraction from the time drift with respect to the PCA with added latency time. The latch 620 stores the value for the PCn time.

A time drift detector is a simple process by which a device that is periodically receiving a time standard from the clock synchronizer checks for the amount that its own clock is drifting from the time standard, and compensates for it by periodically adding or subtracting from its own clock. It assumes that a device's system clock might drift, fast or slow, relative to the master device's clock, and that the rate of drift is constant. The time drift detector may be implemented in hardware, software, or a combination of hardware and software.

Figure 3:
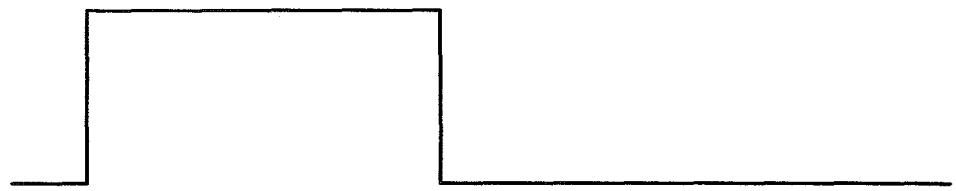
FIG. 3 illustrates the delay on the audio waveform sample through latency and a potential effect of time drift.
Figure 3:
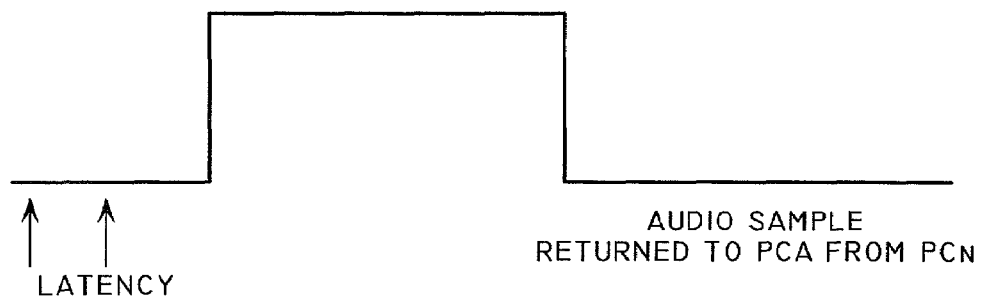
Figure 3:
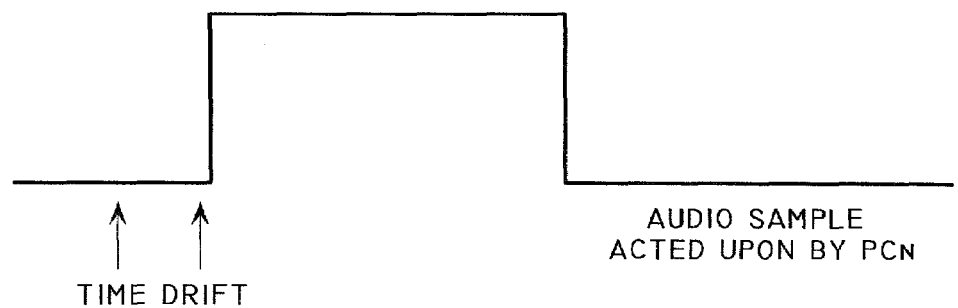

FIG. 3 illustrates time displacements of the audio waveform sample. Approximately one half the time the audio waveform sample travels from PCA to PCn is the latency. A delay occurs from the receipt of the audio waveform sample until it is acted upon by PCn. This is the time drift.

A manual audio synchronization fine-tune control allows the user to "fine tune" the end results of automated synchronization. It also allows the user to manually determine the internal latency of a device audio playback subsystem, by comparing the amount and direction of playback latency error between itself and a reference system with a known internal audio subsystem latency value. The system requires two devices playing audio, one that is the reference (PCA), and one that is adjusted by the user (PCB). The method assumes that the reference player PCA buffers and delays its own audio playback, so that PCB is able to move its own playback either forward or backward in time, relative to PCA. PCA synchronizes its clock with PCB. PCA emits an audible high-pitched pulse every n seconds, on even n second boundaries. PCB emits an audible pulse every n seconds, on even n second boundaries. PCB displays a graphic slider control to the user, defaulted to "centered" position. As the user slides the control left or right, PCB increments/decrements a correction value, and simultaneously shifts the audio click forward or backward in time. The user adjusts the slider until the two clicks converge and sound to the user as a single click. The resultant correction value may be added or subtracted from PCA's known internal latency value, to determine PCB's internal latency value.

The above process describes three separate roles for devices. However, a single device could take on any of the three roles described, i.e., it could be a receiver and the time reference, or the time reference and the audio transmitter, and the like. The process is a single time reference device (probably one of the receivers) first sets its own clock, then sets the clocks on all other receiving devices. Each receiver periodically adjusts itself for time drift. Keeping time synchronized on all receivers is its only responsibility. Each receiving device keeps the playback of the audio in sync with other devices by obtaining the exact time of the received pulse relative to its own (synchronized) clock, and then delaying the audio until the pulse exactly aligns with the next multiple of the pulse interval. For instance, if the pulse interval is once every 5 seconds, but the pulse appears 570 milliseconds prior to 2:15, the audio playback is delayed for 570 milliseconds. Note that the effect of this is that the playback on all devices is in sync, but always behind the transmission by approximately the pulse interval.

PCA transmits to PCB 1) the waveform segment, 2) the exact (delayed) time it is to be played, and 3) PCB's actual latency value. PCB examines its own audio stream, beginning at the current location playing minus the latency value, in other words, it is looking for the spot in the audio that was playing when PCA captured and transmitted the audio segment. PCB searches forward and backward from that spot until it locates the audio segment. PCB synchronizes its audio playback with PCA by delaying the playback until the audio segment is exactly aligned with the exact playback time received from PCA.

Figure 8:
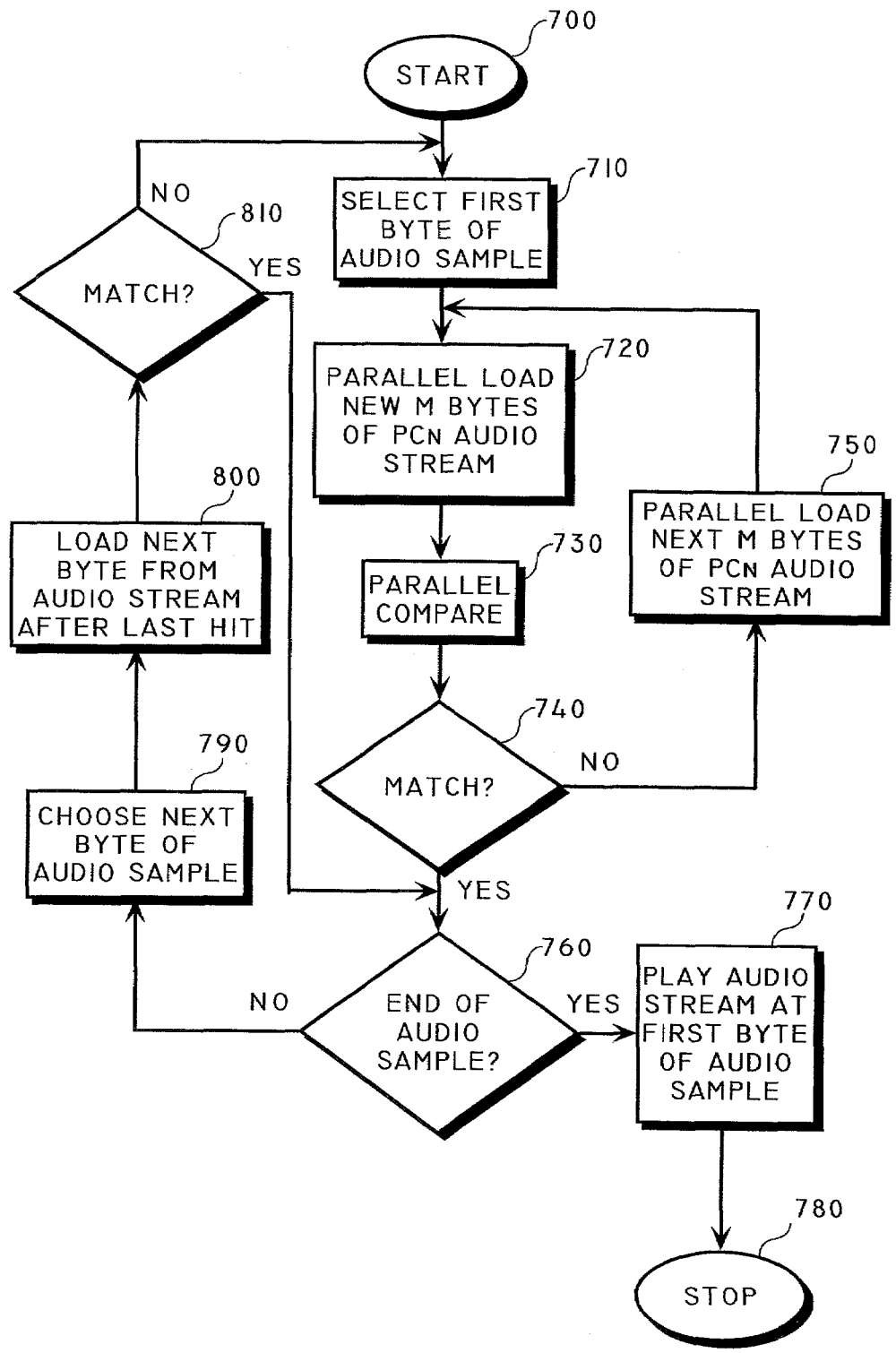
FIG. 8 illustrates a flow chart for finding an audio waveform sample in an audio stream.

FIG. 8 illustrates a flow chart of the process in an exemplary embodiment of the present invention. In step 700, the process starts. A first byte or other unit of the audio waveform sample is selected, step 710. In order to ensure that the processing is completed within a reasonable time, a parallel load of several bytes or data units corresponding to the data unit of the audio waveform sample from the PCn audio stream is performed. The number of bytes, words, or other data units may be great in number or may be as few as one, step 720. Simultaneous compares are performed on the bytes from the audio stream with the sample byte of the audio waveform sample, step 730. If there is no match, step 740, then the next set of m bytes of PCn audio stream data is loaded for comparison with the audio waveform sample byte, step 750. Otherwise, a determination is made as to whether the end of the audio waveform sample has been reached, step 760. If the end has been reached, then the audio stream is played at the designated time beginning at the point corresponding to the first byte of the audio waveform sample, steps 770 and 780. Otherwise, the next byte from the audio waveform sample is selected, step 790. The next byte from the audio stream after the last matched byte in the audio stream is compared, step 800. A determination is made as to whether there is a match, step 810. If there is a match, then the process returns to step 760. Otherwise, the first byte of the audio waveform sample is once again compared against a new set of m bytes of the PCn audio stream.

Provided below is an example of pseudo code for performing the identification of the audio waveform sample in the buffered audio stream of device PCn.

Figure 10:
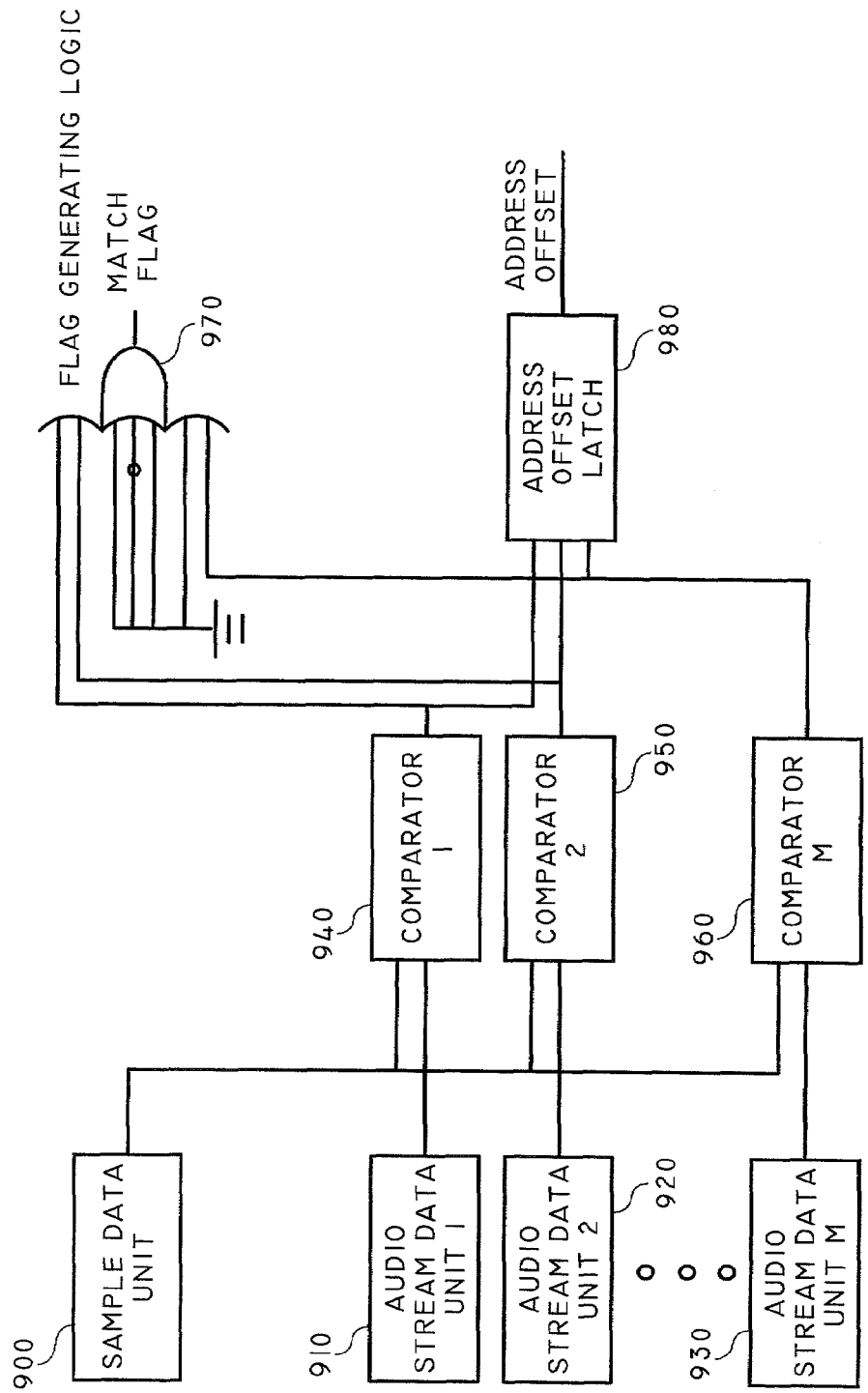
FIG. 10 illustrates a block diagram showing an exemplary hardware implementation for identifying the audio waveform sample in the audio stream.

Load first audio stream portion of one or more data units;
Point C
　Load first data unit of audio waveform sample;
　If first data unit of audio waveform sample =first occurrence of one of the data units of the audio stream, then
Point A
　Increment to next data unit of audio waveform sample;
　Increment to next data unit of audio stream;
　If next data unit of audio waveform sample=next data unit of audio stream,
　　Then go to Point A;
　　Otherwise go to Point B;
　First occurrence of one of the data units of the audio stream =next occurrence of the data units of the audio stream which match the first data unit of audio waveform sample;
　Go to Point C;
Point B FIG. 10 illustrates a block diagram of the operation of audio waveform sample identification in an audio stream. The data unit, such as a byte or word, of the audio waveform sample is loaded into a latch 900. The corresponding data units of a section of the audio waveform are loaded into latches 910, 920, and 930. Comparators 940, 950, and 960 determine if there is a word or data byte match. If there is a match, then logic 970 generates a match flag. The address offset is placed in latch 980. Software could retrieve this information from latch 980 for further processing. For instance, there may be multiple hits in a single comparison. One methodology that may be used in such a case is to sequentially treat the occurrences as hits, as needed, until the entire audio waveform sample is identified.

A more discriminating algorithm may be employed which performs a best guess on the location of the audio waveform sample in the audio stream. This sort of algorithm is useful when any data degradation occurs in either the audio waveform sample or in the audio stream. A further possibility, in the case of no match of the audio waveform sample in the audio stream, is to resend either or both of the audio waveform sample and the audio stream.

It is believed that the method of synchronizing the playback of a digital audio broadcast using an audio waveform sample of the present invention and many of its attendant advantages will be understood by the forgoing description. It is also believed that it will be apparent that various changes may be made in the form, construction and arrangement of the components thereof without departing from the scope and spirit of the invention or without sacrificing all of its material advantages. The form herein before described being merely an explanatory embodiment thereof. It is the intention of the following claims to encompass and include such changes.

The invention claimed is:

1. A method of synchronizing the playback of a digital audio broadcast on a plurality of network output devices by inserting an audio waveform sample in an audio stream of the digital audio broadcast, comprising:
　outputting first and second unique signals as part of an audio signal which has unique identifying characteristics and is regularly occurring, so that the time between the first and second unique signals must be significantly greater than a latency between sending and receiving devices;
　outputting an audio waveform sample;
　outputting an audio stream; and
　coordinating play of audio by setting the play point of the audio stream according to the audio waveform sample assuring the simultaneous output of the audio signal from multiple devices,
　the digital audio broadcast from multiple receiving devices not presenting to a listener any audible delay or echo effect.

2. The method of claim 1, wherein the time between the first and second unique signals is at least one second.

3. The method of claim 2, wherein the time between the first and second unique signals is at least two seconds.

4. The method of claim 2, wherein the time between the first and second unique signals is two seconds, plus or minus 50 milliseconds.

5. The method of claim 1, wherein the latency is derived using each of the first and second signals.

6. The method of claim 5, wherein a transmitting device sends out the first and second unique signals and is clocked at base clock rate.

7. The method of claim 6, wherein the latency is derived by enabling a counter from the time one of the first and second unique signals is sent until the time of its return to the transmitting device, the counter being clocked at one half the base clock rate.

8. The method of claim 7, further comprising determining the time drift of a receiving device.

9. The method of claim 8, wherein the time drift includes the time for the operating system to respond to a command instruction after the unique signals have been received by the receiving device.

10. The method of claim 1, wherein a transmitting device outputs the unique signal, the receiving devices are all in sync, the transmitting device is not in sync with the receiving devices, and one of the receiving devices generates and outputs the audio waveform sample.

11. The method of claim 1, wherein the audio stream is buffered by a transmitting device and the receiving devices.

12. The method of claim 1, wherein the playback of the audio by the receiving devices is manually fine tuned.

13. The method of claim 1, wherein global positioning system data is used by at least one of the multiple receiving devices.

14. A method of synchronizing the playback of a digital audio broadcast on a plurality of network output devices by inserting an audio waveform sample in an audio stream of the digital audio broadcast, comprising:
    outputting first and second unique signals as part of an audio signal which has unique identifying characteristics and is regularly occurring, so that the time between the first and second unique signals must be significantly greater than a latency between sending and receiving devices;
    outputting an audio waveform sample;
    outputting an audio stream;
    identifying the audio waveform sample in the audio stream; and
    coordinating play of audio by setting the play point of the audio stream according to the audio waveform sample assuring the simultaneous output of the audio signal from multiple devices,
    the digital audio broadcast from multiple receiving devices not presenting to a listener any audible delay or echo effect.

15. The method of claim 14, wherein the method of identifying the audio waveform sample includes the steps of selecting a data unit from the audio waveform sample and comparing it with a data unit of the audio stream.

16. The method of claim 15, wherein a set of multiple data units which are consecutively addressed is loaded in parallel for comparison with the data unit from the audio waveform sample.

17. The method of claim 16, wherein if there is no match, a next set of multiple data units which are consecutively addressed is loaded in parallel for comparison with the data unit from the audio waveform sample.

18. The method of claim 17, wherein if there is a match, there is a determination as to whether the end of the audio waveform sample has been reached.

19. The method of claim 18, wherein if it is determined that the end of the audio waveform sample has been reached, the audio stream is allowed to play at a time set by a controlling device from the point of the first data unit of the audio waveform sample.

20. The method of claim 18, wherein if it is determined that the end of the audio waveform sample has not been reached, the next data unit from the audio waveform sample is compared to the next data unit from the audio stream after the data unit from the audio stream which was matched.

21. A system for synchronizing audio playback of multiple receiving devices, comprising:
    a transmitting device; and
    two or more receiving devices, wherein the receiving devices are synchronized through at least two of the group consisting of an audio waveform sample, communication latency, and processing latency;
    wherein the receiving devices are synchronized through audio waveform samples and the communication latency is shorter than the time interval between consecutive audio waveform samples.

22. The method of claim 21, wherein the system has a time drift detector.

23. The method of claim 21, wherein the system has a clock synchronizer.

24. The method of claim 21, wherein the system has a latency detector.

25. The method of claim 21, wherein the system has manual fine tune control.

26. The method of claim 21, wherein the system has a time drift detector, a clock synchronizer, a latency detector, and manual fine tune control.

27. A system for synchronizing the audio playback of two or more receiving devices, comprising:
    means for transmitting consecutive unique signals in an audio stream; and
    means for receiving the consecutive unique signals in the audio stream, the time the means for receiving the unique signal takes to act upon the unique signal being determined by a communications latency between transmitting means and the receiving means and a processing latency determined by internal processing by the receiving means.

28. The method of claim 27, further comprising means for synchronizing clocks located in the receiving means.

29. The method of claim 28, further comprising means for detecting time drift in the receiving means.

30. The method of claim 29, further comprising means for manual fine tune control of the receiving means.

31. The method of claim 30, further comprising means for comparing an audio waveform sample with an audio stream.

32. A system for synchronizing audio playback on multiple output devices, comprising:
    a source device; and
    two or more output devices;
    wherein the source device is configured to transmit an audio waveform sample comprising:
        a content portion to be played with a section of an audio stream identified to play at a specific time coordinate;
        a time to be played portion; and
        a latency time value for at least one of the two or more output devices relative to the source device;
    wherein the at least one output device would output the content as an audio output synchronized with the time to be played minus or plus the latency time.

* * * * *